(12) United States Patent
Yoshikawa et al.

(10) Patent No.: US 12,017,851 B2
(45) Date of Patent: Jun. 25, 2024

(54) STORAGE CABINET

(71) Applicant: Panasonic Intellectual Property Management Co., Ltd., Osaka (JP)

(72) Inventors: Masaaki Yoshikawa, Osaka (JP); Michihiro Matsumoto, Kyoto (JP); Tatsuya Morishita, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 591 days.

(21) Appl. No.: 17/311,976

(22) PCT Filed: Jul. 29, 2020

(86) PCT No.: PCT/JP2020/028963
§ 371 (c)(1),
(2) Date: Jun. 8, 2021

(87) PCT Pub. No.: WO2021/171646
PCT Pub. Date: Sep. 2, 2021

(65) Prior Publication Data
US 2022/0324645 A1 Oct. 13, 2022

(30) Foreign Application Priority Data
Feb. 27, 2020 (JP) .................................. 2020-031399

(51) Int. Cl.
*B65G 1/04* (2006.01)
*F25D 25/00* (2006.01)
*G06Q 10/087* (2023.01)

(52) U.S. Cl.
CPC ......... *B65G 1/0485* (2013.01); *G06Q 10/087* (2013.01); *B65G 2203/0258* (2013.01);
(Continued)

(58) Field of Classification Search
CPC  G06Q 10/087; B65G 1/0485; F25D 2700/08; F25D 2700/02; F25D 2700/06
See application file for complete search history.

(56) References Cited

U.S. PATENT DOCUMENTS 10,591,348 B1 * 3/2020 Shi ....................... G06Q 10/087
10,810,540 B1 * 10/2020 Gopal .................. G06Q 10/087
(Continued)

FOREIGN PATENT DOCUMENTS

JP        2006-329597 A      12/2006

OTHER PUBLICATIONS

International Search Report dated Oct. 13, 2020 in International Patent Application No. PCT/JP2020/028963.

*Primary Examiner* — Timothy R Waggoner
(74) *Attorney, Agent, or Firm* — Rimon P.C.

(57) ABSTRACT

A refrigerator is an example of a storage cabinet, and includes a door sensor, a weight sensor, a wireless tag reader, a memory, and a microcomputer. The microcomputer identifies an ID that is not readable by the wireless tag reader after a timing at which a weight increase is detected by the weight sensor in a first period, as an ID of a newly loaded food item, the first period being a period from when a door is opened to when the door is closed that is determined based on a result of detection performed by the door sensor, and adds the identified ID to registration information that is stored in the memory.

9 Claims, 19 Drawing Sheets

(52) U.S. Cl.
CPC .......... *F25D 25/00* (2013.01); *F25D 2700/06* (2013.01); *F25D 2700/08* (2013.01)

(56) References Cited

U.S. PATENT DOCUMENTS

| | | | |
|---|---|---|---|
| 11,436,557 B1 * | 9/2022 | Kumar | G06Q 10/087 |
| 11,501,594 B2 * | 11/2022 | Dai | G06Q 20/18 |
| 2014/0316561 A1 * | 10/2014 | Tkachenko | G06Q 10/087 700/236 |
| 2017/0039511 A1 * | 2/2017 | Corona | G06Q 10/087 |

\* cited by examiner

| Registration information | | | |
|---|---|---|---|
| ID | Weight | Position | Food code number |
| ID201 | 50 g | ○○ | : |
| ID202 | : | : | : |
| ID203 | : | : | : |
| : | : | : | : |
| ID210 | : | : | : |

FIG. 8

| Temporary ID | Loaded item information | | First wireless tag information | Second wireless tag information |
|---|---|---|---|---|
| | Weight | Position | | |
| ID1001 | 100 g | ×× | ID201 – ID210, ID101, ID102, ID103 | ID201 – ID210, ID101, ID102, ID103 |
| ID1002 | 200 g | □□ | ID201 – ID210, ID101, ID102, ID103 | ID201 – ID210, ID101, ID102, ID103 |
| ID1003 | 400 g | □○ | ID201 – ID210, ID101, ID102, ID103 | ID201 – ID210, ID101, ID102 |

FIG. 9

| Third wireless tag information | | |
|---|---|---|
| ID | Weight | Food code number |
| ID201 | 50 g | : |
| ID202 | : | : |
| ID203 | : | : |
| : | : | : |
| ID210 | : | : |
| ID101 | 100 g | : |
| ID102 | 200 g | : |

Candidate IDs { ID101, ID102 }

FIG. 11

| Registration information | | | |
|---|---|---|---|
| ID | Weight | Position | Food code number |
| ID201 | 50 g | ○○ | : |
| ID202 | : | : | : |
| ID203 | : | : | : |
| : | : | : | : |
| ID210 | : | : | : |
| ID101 | 100 g | ×× | : |
| ID102 | 200 g | □□ | : |
| ID103 | 400 g | □○ | : |

Added { ID101, ID102, ID103 }

FIG. 13

| Temporary ID | Unloaded item information | | Fourth wireless tag information |
|---|---|---|---|
| | Weight | Position | |
| ID2001 | 100 g | ×× | ID201 - ID210, ID101,ID102 |
| ID2002 | 200 g | □□ | ID201 - ID210, ID101,ID102 |
| ID2003 | 400 g | □○ | ID201 - ID210, ID101,ID102,ID103 |

FIG. 14

| Fifth wireless tag information | | |
|---|---|---|
| ID | Weight | Food code number |
| ID201 | 50 g | : |
| ID202 | : | : |
| ID203 | : | : |
| : | : | : |
| ID210 | : | : |
| ID103 | 400 g | : |

FIG. 16

| Registration information | | | |
|---|---|---|---|
| ID | Weight | Position | Food code number |
| ID201 | 50 g | ○○ | : |
| ID202 | : | : | : |
| ID203 | : | : | : |
| : | : | : | : |
| ID210 | : | : | : |
| ID101 | 100 g | ××(=Temporary ID 1001) or □□(=Temporary ID 1002) | : |
| ID102 | 100 g | ××(=Temporary ID 1001) or □□(=Temporary ID 1002) | : |
| ID103 | 400 g | □○ | : |

FIG. 17

| Temporary ID | Loaded item information | | First wireless tag information | Second wireless tag information |
|---|---|---|---|---|
| | Weight | Position | | |
| ID1004 | 300 g | ×□ | ID201 – ID210, ID101, ID102, ID103 | ID201 – ID210, ID101, ID102, ID103 |
| ID1003 | 400 g | □○ | ID201 – ID210, ID101, ID102, ID103 | ID201 – ID210, ID101, ID102 |

FIG. 18

| Registration information | | | |
|---|---|---|---|
| ID | Weight | Position | Food code number |
| ID201 | 50 g | ○○ | : |
| ID202 | : | : | : |
| ID203 | : | : | : |
| : | : | : | : |
| ID210 | : | : | : |
| ID101 | 100 g | ×□ | : |
| ID102 | 200 g | (=Temporary ID 1004) | : |
| ID103 | 400 g | □○ | : |

FIG. 19

| Temporary ID | Loaded item information | | | First wireless tag information | Second wireless tag information |
|---|---|---|---|---|---|
| | Weight | Position | Shelf | | |
| ID1001 | 100 g | ×× | Top (vegetables) | ID201 ~ ID210, ID101, ID102, ID103 | ID201 ~ ID210, ID101, ID102, ID103 |
| ID1002 | 100 g | ☐☐ | Second top (dairy products) | ID201 ~ ID210, ID101, ID102, ID103 | ID201 ~ ID210, ID101, ID102, ID103 |
| ID1003 | 400 g | ☐○ | Second top (dairy products) | ID201 ~ ID210, ID101, ID102, ID103 | ID201 ~ ID210, ID101, ID102 |

FIG. 20

| Third wireless tag information | | |
|---|---|---|
| ID | Weight | Food code number |
| ID201 | 50 g | : |
| ID202 | : | : |
| ID203 | : | : |
| : | : | : |
| ID210 | : | : |
| ID101 | 100 g | ○×○ (Vegetables) |
| ID102 | 100 g | ○○○ (Dairy products) |

Candidate IDs: ID101, ID102

STORAGE CABINET

CROSS-REFERENCE OF RELATED APPLICATIONS

This application is the U.S. National Phase under 35 U.S.C. § 371 of International Patent Application No. PCT/JP2020/028963, filed on Jul. 29, 2020, which in turn claims the benefit of Japanese Application No. 2020-031399, filed on Feb. 27, 2020, the entire disclosures of which Applications are incorporated by reference herein.

TECHNICAL FIELD

The present disclosure relates to a storage cabinet.

BACKGROUND ART

Conventionally, techniques for a storage cabinet for storing items have been proposed. Patent Literature (PTL) 1 discloses a refrigerator, with which the best-before dates of food items can be managed.

CITATION LIST

Patent Literature

[PTL 1] Japanese Unexamined Patent Application Publication No. 2006-329597

SUMMARY OF INVENTION

Technical Problem

The present disclosure provides a storage cabinet with improved management accuracy of items to be stored.

Solution to Problem

A storage cabinet according to an aspect of the present disclosure is a storage cabinet including a door and a shelf on which items are placed, wherein the items are placed on the shelf while the door is open, the storage cabinet including: a door sensor that detects whether the door is open or closed; a weight sensor that detects a weight applied to the shelf; a wireless tag reader that reads IDs from wireless tags attached to the items; a memory that stores the IDs of the items in the storage cabinet read by the wireless tag reader, as registration information; and a microcomputer, wherein the microcomputer: identifies, from among IDs that are readable by the wireless tag reader after a first period, a candidate ID that is an ID that is not included in the registration information, as a first ID of a first item that is newly loaded, the first period being a period from when the door is opened to when the door is closed that is determined based on a result of detection performed by the door sensor; identifies an ID that is not readable by the wireless tag reader immediately after a weight increase is detected by the weight sensor in the first period, as a second ID of a second item that is newly loaded; and adds, to the registration information, the first ID identified and the second ID identified.

Advantageous Effects of Invention

According to the present disclosure, a storage cabinet with improved management accuracy of items to be stored is achieved.

BRIEF DESCRIPTION OF DRAWINGS

FIG. 8 is a diagram showing an example of loaded item management information.

FIG. 9 is a diagram showing an example of third wireless tag information.

FIG. 11 is a diagram showing an example of updated registration information.

FIG. 13 is a diagram showing an example of unloaded item management information.

FIG. 14 is a diagram showing an example of fifth wireless tag information.

FIG. 16 is a diagram showing an example of registration information according to Variation 1.

FIG. 17 is a diagram showing an example of loaded item management information according to Variation 2.

FIG. 18 is a diagram showing an example of registration information according to Variation 2.

FIG. 19 is a diagram showing an example of loaded item management information according to Variation 3.

FIG. 20 is a diagram showing an example of third wireless tag information according to Variation 3.

DESCRIPTION OF EMBODIMENTS

Figure 1:
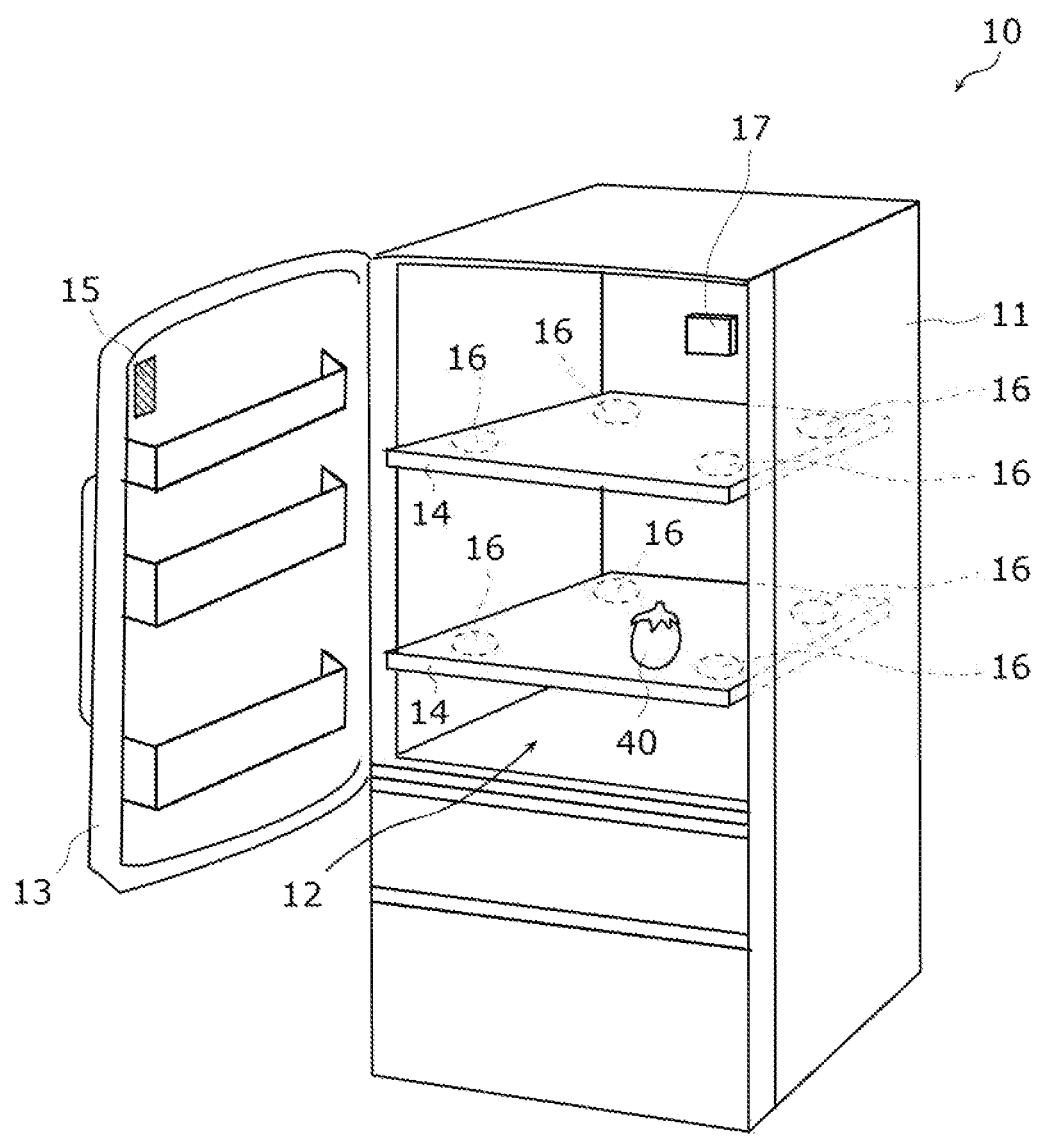
FIG. 1 is an external view of a refrigerator according to an embodiment.

Hereinafter, embodiments will be described specifically with reference to the drawings. The embodiments described below show generic or specific examples of the present disclosure. The numerical values, shapes, materials, structural elements, the arrangement and connection of the structural elements, steps, the order of the steps, and the like shown in the following embodiments are merely examples, and therefore are not intended to limit the scope of the present disclosure. Also, among the structural elements described in the following embodiments, structural elements not recited in any one of the independent claims are described as arbitrary structural elements.

The diagrams are schematic representations, and thus are not necessarily true to scale. Also, in the diagrams, structural elements that are substantially the same are given the same reference numerals, and a redundant description may be omitted or simplified.

Embodiment 1

Configuration

Figures 2, 3:
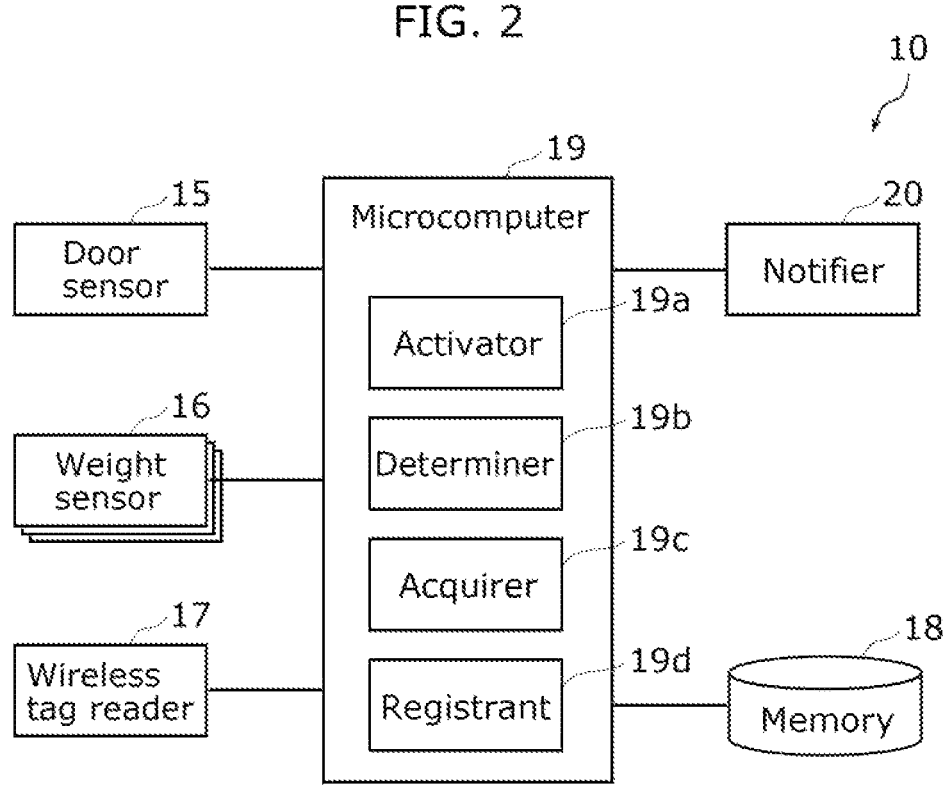
FIG. 2 is a block diagram showing a functional configuration of the refrigerator according to the embodiment.
FIG. 3 is a diagram showing an example of registration information.

First, a configuration of a refrigerator according to Embodiment 1 will be described. FIG. 1 is an external view of the refrigerator according to Embodiment 1. FIG. 2 a block diagram showing a functional configuration of the refrigerator according to Embodiment 1.

Refrigerator 10 according to Embodiment 1 can manage food items 40 stored in refrigerator 10 by reading a wireless tag attached to each food item 40. As shown in FIG. 1, refrigerator 10 includes main body 11, door 13 for accessing internal space 12 of main body 11, and a plurality of shelves 14 provided in internal space 12. The user can place food items 40 on each of the plurality of shelves 14 by opening door 13.

Also, as shown in FIGS. 1 and 2, refrigerator 10 includes door sensor 15, a plurality of weight sensors 16, wireless tag reader 17, memory 18, microcomputer 19, and notifier 20.

Door sensor 15 detects whether door 13 is open or closed. Door sensor 15 is, for example, a magnetic sensor that is implemented by a magnet attached to one of door 13 and main body 11 and a magnet sensor attached to the other one of door 13 and main body 11.

Weight sensors 16 each detect a weight applied to shelf 14. For example, weight sensors 16 are provided at four corners of each shelf 14. By doing so, the position of each food item 40 on shelf 14 can be identified based on the balance of weights detected by four weight sensors 16 when food item 40 is placed on shelf 14. Identifying position is not a requirement, and only one weight sensor 16 may be provided for each shelf 14.

Wireless tag reader 17 reads a wireless tag ID from a wireless tag attached to each food item 40. Wireless tag reader 17 is, to put it differently, an RFID (Radio Frequency Identifier) tag reader, and reads an ID from a wireless tag through near field communication. The wireless tags may be, for example, passive RFID tags. Wireless tag reader 17 is provided in internal space 12. That is, wireless tag reader 17 is provided within main body 11. Information that can be read from each wireless tag may include, in addition to the wireless tag ID, the weight of the food item, a food code number that indicates the type, the product name and the like of the food item, and the like. The wireless tag ID is a unique ID given to each tag.

Memory 18 stores wireless tag IDs read by wireless tag reader 17 as wireless tag IDs of food items 40 stored in refrigerator 10. Hereinafter, information that includes wireless tag IDs of food items 40 stored in refrigerator 10 will also be referred to as "registration information". FIG. 3 is a diagram showing an example of the registration information. Memory 18 also stores a computer program executed by microcomputer 19. Memory 18 is implemented by, for example, a semiconductor memory.

Microcomputer 19 executes the computer program stored in memory 18, and thereby performs information processing for managing food items 40 stored in refrigerator 10. Microcomputer 19 includes, specifically, activator 19a, determiner 19b, acquirer 19c, and registrant 19d.

Notifier 20 notifies the user of a start timing at which weight sensors 16 start weight measurement and an end timing at which weight sensors 16 finish the weight measurement. Notifier 20 is, for example, a sound outputting device that notifies the above-described timings by outputting a sound, such as a speaker or a beeper, but may be a light emitting device that notifies the above-described timings by emitting light.

Overall Operations

Figure 4:
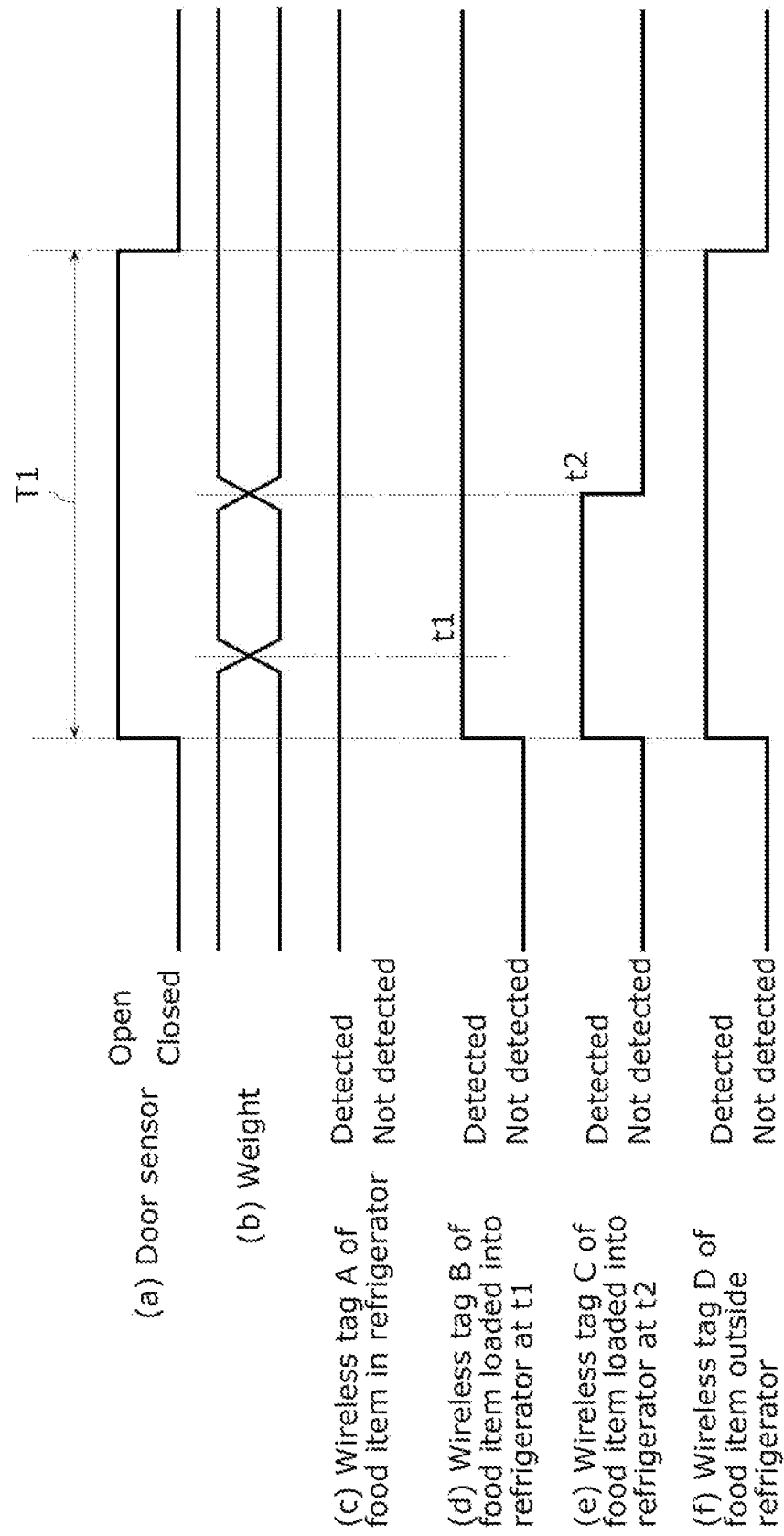
FIG. 4 is a time chart illustrating an overall operation of the refrigerator according to the embodiment.

Next, an overall operation of refrigerator 10 will be described. Refrigerator 10 can manage food items 40 stored in refrigerator 10 by reading (hereinafter, also referred to as detecting) a wireless tag attached to each food item 40. As described above, wireless tag reader 17 for reading wireless tags is provided in internal space 12 of refrigerator 10. In the case where main body 11 and door 13 have the function of blocking (or attenuating) radio waves as a result of main body 11 and door 13 containing metal members or the like, wireless tag reader 17 can read only wireless tags of food items 40 that are in internal space 12 while door 13 is closed. On the other hand, when door 13 is open, wireless tag reader 17 can also read wireless tags of food items 40 that are outside of internal space 12 as long as food items 40 are within an effective range of near field communication. FIG. 4 is a time chart illustrating an overall operation of refrigerator 10 configured as described above. (a) in FIG. 4 shows a detection result of door sensor 15, or in other words, it shows whether door 13 is open or closed, and first period T1 is a period from when door 13 is opened to when door 13 is closed. (b) in FIG. 4 shows a detection result of weight sensors 16, or in other words, a timing at which food item 40 is placed on shelf 14.

As shown in (c) in FIG. 4, wireless tag A of food item 40 that was stored in refrigerator 10 before first period T1 is detected by wireless tag reader 17 throughout before and after first period T1.

Also, as shown in (f) in FIG. 4, the wireless tag D of food item 40 that is outside of refrigerator 10 can be detected by wireless tag reader 17 only in first period T1. That is, food item 40 that is outside of refrigerator 10 can be detected by wireless tag reader 17 only in the period in which door 13 is open.

Also, as shown in (d) in FIG. 4, wireless tag B of food item 40 that is loaded into refrigerator 10 (or in other words, that is placed on shelf 14) at timing t1 can be detected by wireless tag reader 17 after a timing at which door 13 was open.

Here, there may be a case where the wireless tag of food item 40 loaded into refrigerator 10 is not detected as a result of coming into contact with shelf 14. This case may occur, for example, when shelves 14 include a metal portion. Specifically, the wireless tag C shown in (e) in FIG. 4 can be detected by wireless tag reader 17 in a period from when door 13 is open to timing t2 at which food item 40 is placed on shelf 14, but cannot be detected after that.

Simply, if only a wireless tag that is detectable even after door 13 is closed is used as the wireless tag of food item 40 loaded into refrigerator 10, in the case of (e) in FIG. 4, a problem arises in that food item 40 is left unmanaged despite the fact that food item 40 is actually in refrigerator 10.

Accordingly, in refrigerator 10, an algorithm is used with which food item 40 can be managed appropriately even in the case of (e) in FIG. 4.

Example Operation of Loading Food Item

Figure 5:
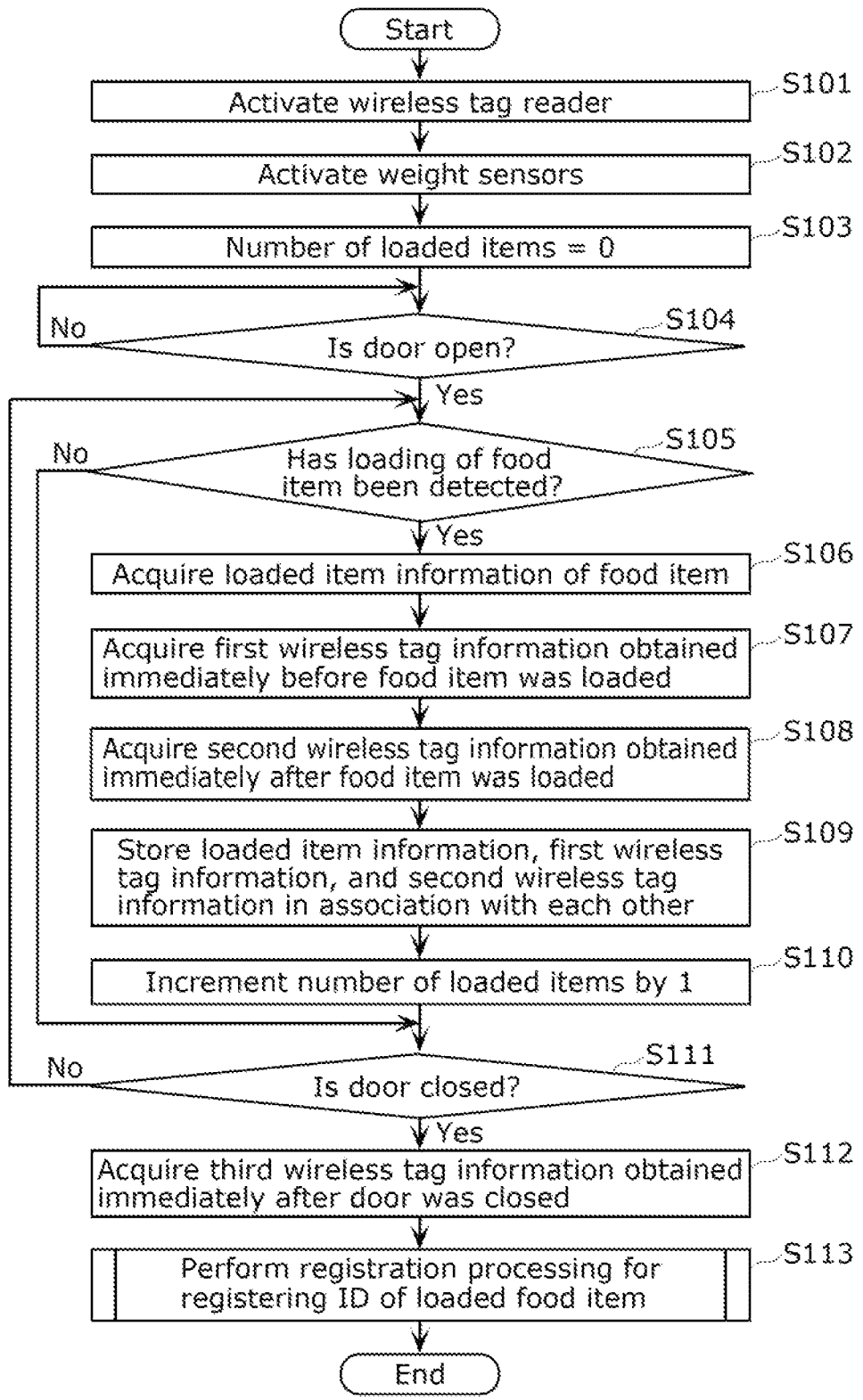
FIG. 5 is a flowchart illustrating an operation of the refrigerator according to the embodiment when a food item is loaded into the refrigerator.

Hereinafter, a detailed description of the algorithm (operation) will be given. FIG. 5 is a flowchart illustrating an operation of refrigerator 10 when food item 40 is loaded into refrigerator 10. The description will be given based on the following assumption. In a state in which ten food items 40 with wireless tags in which IDs 201 to 210 are recorded are already in refrigerator 10, three food items 40 with wireless tags in which IDs 101 to 103 are recorded are additionally loaded into refrigerator 10. Food item 40 with a wireless tag in which ID 101 is recorded and food item 40 with a wireless tag in which ID 102 is recorded are loaded into refrigerator 10 in a normal way, and the wireless tag IDs of food items 40 can be read even after food items 40 have been loaded into refrigerator 10 as shown in (d) in FIG. 4 described above. However, the wireless tag ID of food item 40 with a wireless tag in which ID 103 is recorded cannot be read after it has been loaded into refrigerator 10 as shown in (e) in FIG. 4 described above. The three food items 40 are placed, for example, on one shelf 14.

Figure 6:
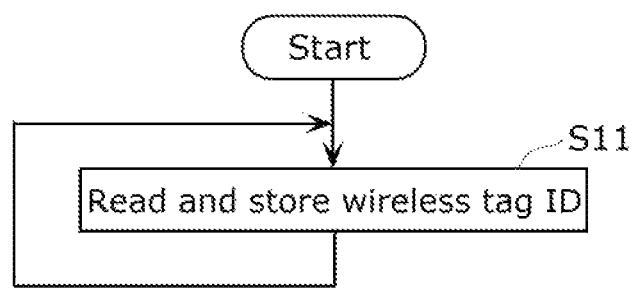
FIG. 6 is a flowchart illustrating an operation of a wireless tag reader.
Figure 7:
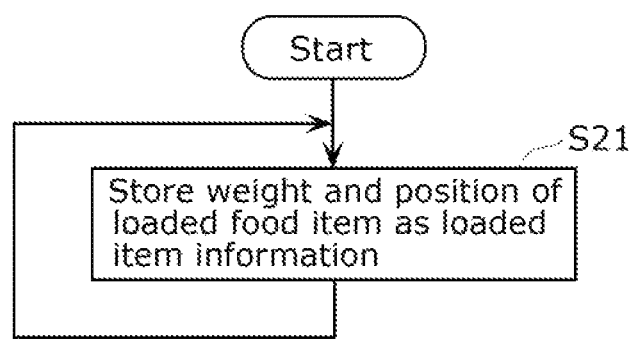
FIG. 7 is a flowchart illustrating an operation of a weight sensor.

First, activator 19a transmits an activation signal or the like so as to activate wireless tag reader 17 (S101), and activate the plurality of weight sensors 16 (S102). As shown in FIG. 6, wireless tag reader 17 in operation repeats an operation of reading the wireless tag ID of a wireless tag within a communication range and storing the read wireless tag ID in an internal memory (S11). FIG. 6 is a flowchart illustrating an operation of wireless tag reader 17. Also, as shown in FIG. 7, the plurality of weight sensors 16 in operation store, each time it is detected that food item 40 has been loaded, the weight and the position of loaded food item 40 in their internal memories as loaded item information (S21). FIG. 7 is a flowchart illustrating an operation of weight sensor 16. Loading food item 40 means that food item 40 is placed on shelf 14, and unloading food item 40 means that food item 40 is removed from shelf 14.

Next, determiner 19b resets the number of loaded items to 0 (S103), and determines, based on the result of detection performed by door sensor 15, whether or not door 13 is open (S104). This determination is made continuously until door 13 opens (No in S104).

If it is determined that door 13 is open (Yes in S104), determiner 19b determines whether or not loading of food item 40 (an increase in weight) has been detected by weight sensors 16 (S105). If it is determined by determiner 19b that loading of food item 40 has been detected, (Yes in S105), acquirer 19c acquires the loaded item information (weight information and position information) of loaded food item 40 from the internal memories of weight sensors 16 (S106). Also, acquirer 19c acquires, from wireless tag reader 17, first wireless tag information that indicates the wireless tag IDs of food items 40 that were read immediately before food item 40 was loaded into refrigerator 10 (S107), and acquires second wireless tag information that indicates the wireless tag IDs of food items 40 that were read immediately after loading of food item 40 was detected (S108). Then, acquirer 19c stores the loaded item information, the first wireless tag information, and the second wireless tag information in memory 18 in association with each other as loaded item management information (S109). FIG. 8 is a diagram showing an example of the loaded item management information. As shown in FIG. 8, in the loaded item management information, a temporary ID is given to each loaded item information set. The temporary ID is given to each position information set, and thus may be referred to as position ID. The temporary ID may be regarded as position information. Although not shown in FIG. 8, it is possible to read, from each wireless tag, weight and food code number in addition to the wireless tag ID, and information regarding the weight and the food code number are also included in the loaded item management information (specifically, the first wireless tag information and the second wireless tag information). After that, determiner 19b increments the number of loaded items by 1 (S110).

After step S110 and when loading of a food item is not detected in step S105 (No in S105), determiner 19b determines whether or not door 13 is closed (S111). If it is determined that door 13 is not closed (No in S111), determiner 19b returns to the determination processing of step S105.

On the other hand, if it is determined by determiner 19b that door 13 is closed (Yes in S111), acquirer 19c acquires third wireless tag information that indicates wireless tag IDs that were read immediately after door 13 was closed, and stores the third wireless tag information in memory 18 (S112). FIG. 9 is a diagram showing an example of the third wireless tag information. In the example shown in FIG. 9, the third wireless tag information includes, in addition to the wireless tag ID, the weight and the food code number of food item 40, and the like. As described above, information regarding the weight, the food code number, and the like are also included in each wireless tag.

Figure 10:
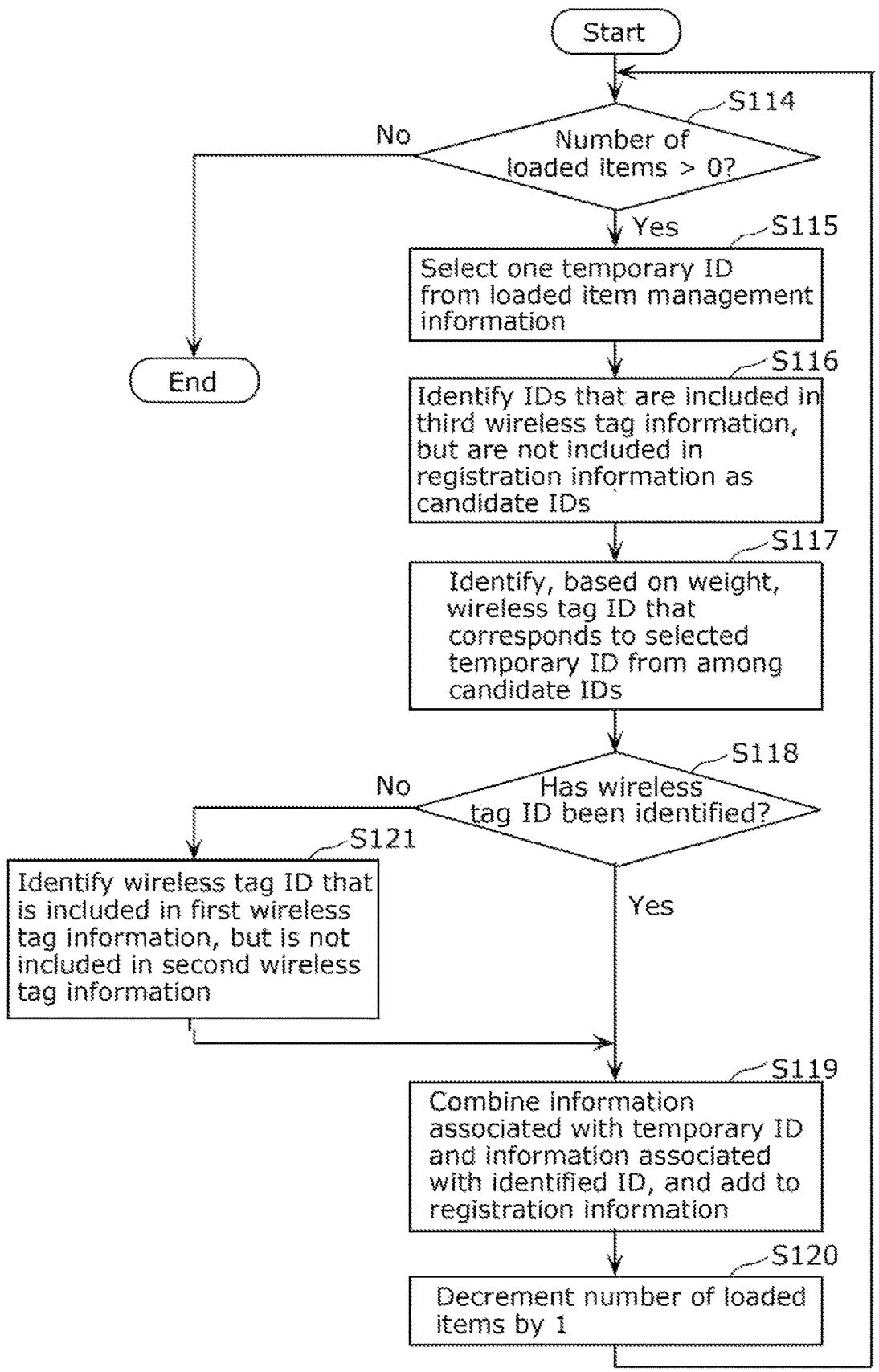
FIG. 10 is a flowchart illustrating registration processing for registering a wireless tag ID of a loaded food item.

After step S112, registrant 19d performs registration processing for registering the wireless tag ID of loaded food item 40 (S113). FIG. 10 is a flowchart illustrating registration processing for registering the wireless tag ID of loaded food item 40.

First, registrant 19d determines whether or not the number of loaded items is greater than 0 (S114). If it is determined that the number of loaded items is 0 (No in S114), the operation ends. If it is determined that the number of loaded items is greater than 0 (Yes in S114), registrant 19d selects one temporary ID from the loaded item management information (see FIG. 8) (S115).

Next, registrant 19d compares the registration information stored in memory 18 with the third wireless tag information (FIG. 9), and identifies wireless tag IDs that are included in the third wireless tag information and are not included in the registration information, as candidate IDs (S116). This processing is, to put it differently, processing for identifying the wireless tag ID of newly loaded food item 40. Here, ID 101 and ID 102 correspond to the wireless tag IDs that are included in the third wireless tag information (see FIG. 9) and are not included in the registration information (see FIG. 3).

Next, registrant 19d identifies, based on the weight of food item 40, a wireless tag ID that corresponds to the temporary ID selected in step S115 from among the candidate IDs identified in step S116 (S117). For example, if it is assumed that temporary ID 1001 has been selected in step S115, the weight of food item 40 with temporary ID 1001 is 100 g (see FIG. 8). Accordingly, it is possible to identify that a wireless ID that corresponds to temporary ID 1001 is, in the third wireless tag information (see FIG. 9), ID 101 that is associated with 100 g, and is not ID 102 that is associated with 200 g.

If it is possible to identify the wireless tag ID as described above (Yes in S118), registrant 19d combines the information (weight and food code number) associated with the identified wireless tag ID and the information (weight and position) associated with the temporary ID, adds the combined information to the registration information (S119), decrements the number of loaded items by 1 (S120), and returns to the determination processing of step S114.

On the other hand, there may be a case where a wireless tag ID that corresponds to the temporary ID cannot be identified in step S117. For example, if it is assumed that temporary ID 1003 has been selected in step S115, the weight of food item 40 with temporary ID 1003 is 400 g (see FIG. 8). Because a wireless tag ID associated with 400 g is not included in the candidate IDs (ID 101 and ID 102) identified in step S116, it is not possible to identify a wireless tag ID that corresponds to temporary ID 1003.

As described above, if it is not possible to identify a wireless tag ID that corresponds to the temporary ID in step S117 (No in S118), registrant 19*d* compares the first wireless tag information and the second wireless tag information that are associated with the selected temporary ID in the loaded item management information (see FIG. 8), and identifies a wireless tag ID (ID 103 in the example shown in FIG. 8) that is included in the first wireless tag information, but is not included in the second wireless tag information, as a wireless tag ID that corresponds to the temporary ID (S121). Registrant 19*d* combines the information (weight and food code number) associated with the identified wireless tag ID and the information (weight and position) associated with the temporary ID, adds the combined information to the registration information (S119), decrements the number of loaded items by 1 (S120), and returns to the determination processing of step S114.

As a result of registration processing described above, the registration information is updated from the state shown in FIG. 2 to the state shown in FIG. 11. FIG. 11 is a diagram showing an example of the updated registration information.

As described above, in step S121, refrigerator 10 identifies an ID that cannot be read by wireless tag reader 17 after a timing at which an increase in weight has been detected by weight sensors 16 in first period T1, as the wireless tag ID of newly loaded food item 40. By doing so, it is possible to manage the ID of food item 40 that has a wireless tag that cannot be read, as a result of food item 40 being placed on shelf 14. That is, refrigerator 10 with improved management accuracy of food items 40 can be achieved.

In step S116 described above, a wireless tag ID that is included in the third wireless tag information and is not included in the registration information is identified as a candidate ID. However, a wireless tag ID that is included in the first wireless tag information and the third wireless tag information and is not included in the registration information may be identified as a candidate ID.

Also, in the case where there is only one candidate ID in step S117 described above, it is unnecessary to identify a wireless tag ID that corresponds to the temporary ID based on weight.

Example Operation of Unloading Food Item

Figure 12:
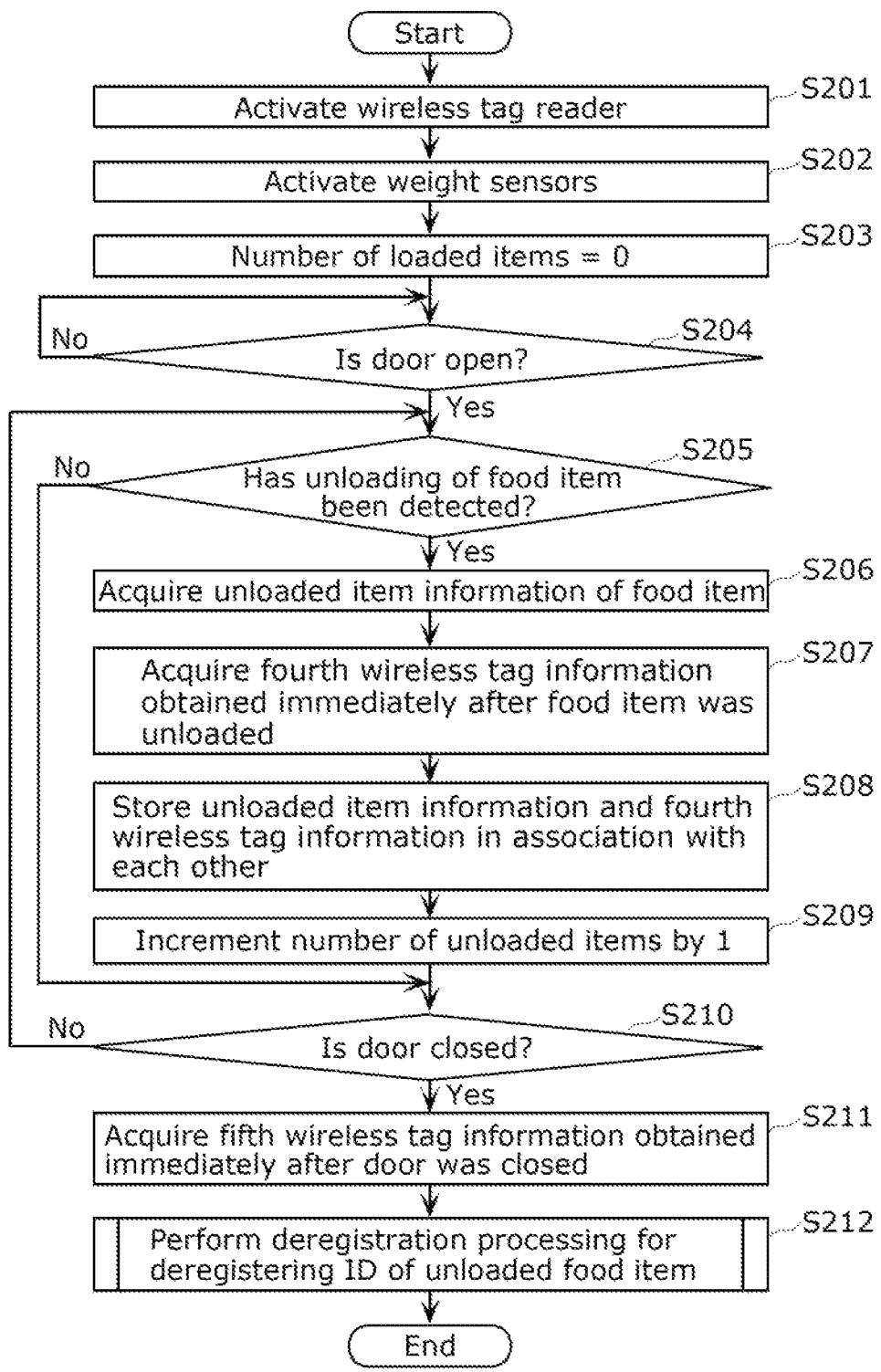
FIG. 12 is a flowchart illustrating an operation of the refrigerator according to the embodiment when a food item is unloaded from the refrigerator.

Next, an operation performed when food item 40 is unloaded from refrigerator 10 will be described. FIG. 12 is a flowchart illustrating an operation of refrigerator 10 when food item 40 is unloaded from refrigerator 10. The following description will be given assuming that three food items 40 with wireless tag IDs 101 to 103 are unloaded from refrigerator 10.

First, activator 19*a* transmits an activation signal or the like so as to activate wireless tag reader 17 (S201), and activate the plurality of weight sensors 16 (S202).

Next, determiner 19*b* resets the number of unloaded items to 0 (S203), and determines, based on the result of detection performed by door sensor 15, whether or not door 13 is open (S204). This determination is made continuously until door 13 opens (No in S204).

If it is determined that door 13 is open (Yes in S204), determiner 19*b* determines whether or not unloading of food item 40 (or in other words, a reduction in weight) has been detected by weight sensors 16 (S205). If it is determined by determiner 19*b* that unloading of food item 40 has been detected (Yes in S205), acquirer 19*c* acquires unloaded item information (weight and position) of unloaded food item 40 based on changes in the measurement values of weight sensors 16 (S206). Also, acquirer 19*c* acquires, from wireless tag reader 17, fourth wireless tag information that indicates wireless tag IDs that were read immediately after unloading of food item 40 was detected (S207).

Then, acquirer 19*c* stores the unloaded item information and the fourth wireless tag information in memory 18 in association with each other as unloaded item management information (S208). FIG. 13 is a diagram showing an example of the unloaded item management information. As shown in FIG. 13, in the unloaded item management information, a temporary ID is given to each unloaded item information set. Also, the fourth wireless tag information shown in FIG. 13 indicates unloaded food items 40 in ascending order of temporary ID. That is, the fourth wireless tag information shown in FIG. 13 indicates that food item 40 with temporary ID 2003 was unloaded last. After that, determiner 19*b* increments the number of unloaded items by 1 (S209).

After step S209 and when unloading of a food item is not detected in step S205 (No in S205), determiner 19*b* determines whether or not door 13 is closed (S210). If it is determined that door 13 is not closed (No in S210), determiner 19*b* returns to the determination processing of step S205.

On the other hand, if it is determined by determiner 19*b* that door 13 is closed (Yes in S210), acquirer 19*c* acquires fifth wireless tag information that indicates wireless tag IDs that were read immediately after door 13 was closed, and stores the fifth wireless tag information in memory 18 (S211). FIG. 14 is a diagram showing an example of the fifth wireless tag information.

Figure 15:
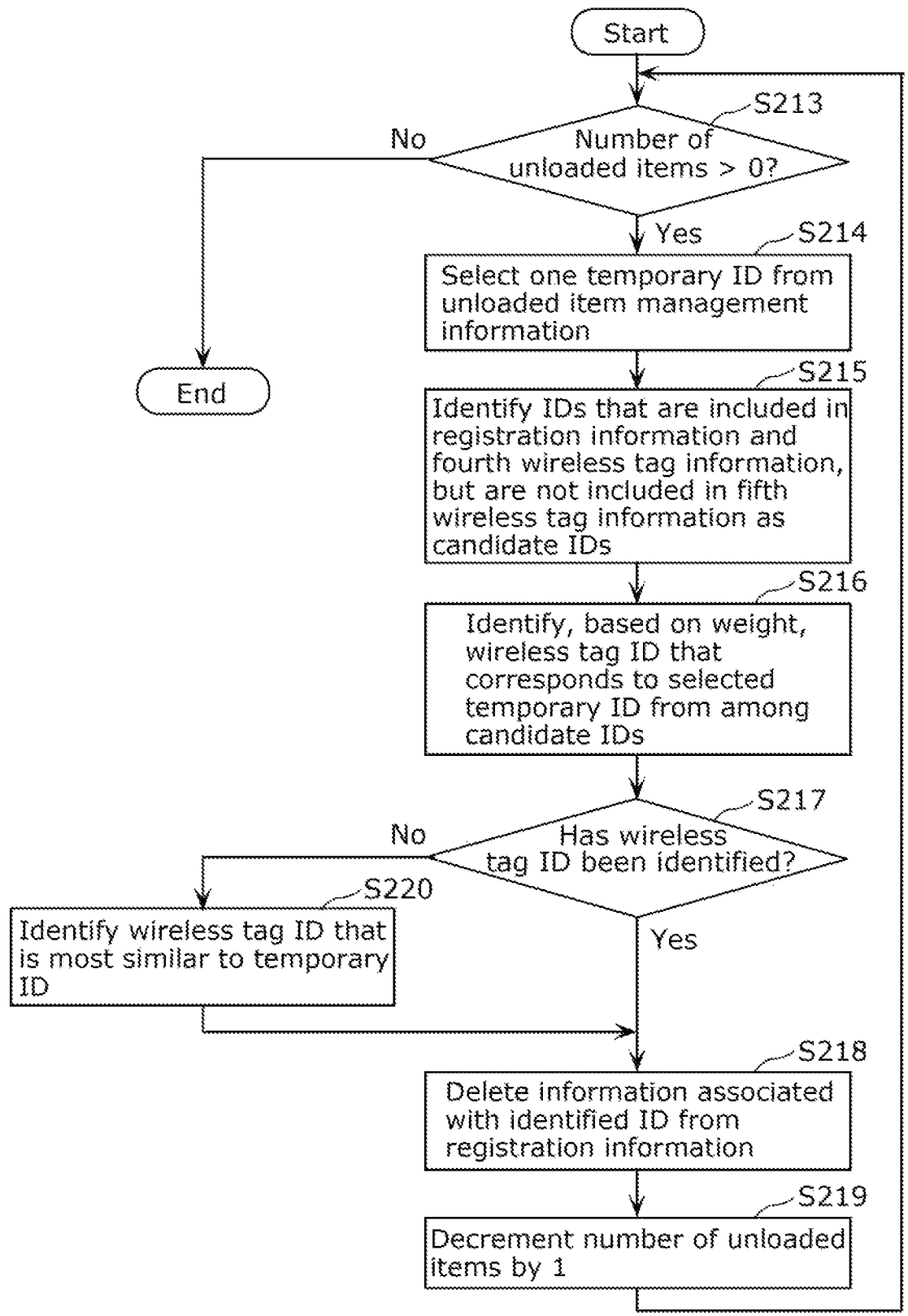
FIG. 15 is a flowchart illustrating deregistration processing for deregistering a wireless tag ID of an unloaded food item.

After step S211, registrant 19*d* performs deregistration processing for deregistering a wireless tag ID of unloaded food item 40 (S212). FIG. 15 is a flowchart illustrating the deregistration processing for deregistering a wireless tag ID of unloaded food item 40.

First, registrant 19*d* determines whether or not the number of unloaded items is greater than 0 (S213). If it is determined that the number of unloaded items is 0 (No in S213), the operation ends. If it is determined that the number of unloaded items is greater than 0 (Yes in S213), registrant 19*d* selects one temporary ID from the unloaded item management information (see FIG. 13) (S214).

Next, registrant 19*d* compares the registration information (see FIG. 11) stored in memory 18 immediately before door 13 was open, the fourth wireless tag information that is associated with the target temporary ID, and the fifth wireless tag information (see FIG. 14), and identifies wireless tag IDs that are included in the registration information and the fourth wireless tag information and are not included in the fifth wireless tag information as candidate IDs (S215). This processing is, to put it differently, processing for identifying the wireless tag ID of unloaded food item 40. Here, ID 101 and ID 102 correspond to the wireless tag IDs that are included in the registration information and the fourth wireless tag information, and are not included in the fifth wireless tag information (see FIG. 14).

Even for food item 40 whose wireless tag cannot be read as a result of being placed on shelf 14, the wireless tag can be recognized immediately after food item 40 is unloaded from refrigerator 10. Accordingly, by checking that the wireless tag ID is included in the fourth wireless tag information, it is possible to identify unloaded food item 40 with high accuracy. The wireless tag ID of food item 40 that cannot be read as a result of food item 40 being placed on shelf 14 is not included in the fourth wireless tag information unless food item 40 is unloaded, and none of ID 101 and ID 102 corresponds to the wireless tag ID.

Next, registrant 19*d* identifies, based on the weight of food item 40, a wireless tag ID that that corresponds to the temporary ID selected in step S214 from among the candidate IDs identified in step S215 (S216). For example, if it is assumed that temporary ID 2001 has been selected in step S214, the weight of food item 40 with temporary ID 2001 is 100 g (see FIG. 13). Accordingly, it is possible to identify that a wireless ID that corresponds to temporary ID 2001 is, in the registration information (see FIG. 11), ID 101 that is associated with 100 g, and is not ID 102 that is associated with 200 g.

If it is possible to identify the wireless tag ID as described above (Yes in S217), registrant 19*d* deletes the information (weight, position, and food code number) associated with the identified wireless tag ID from the registration information (S218), decrements the number of unloaded items by 1 (S219), and returns to the determination processing of step S213.

On the other hand, there may be a case where a wireless tag ID that corresponds to the temporary ID cannot be identified in step S216. For example, if it is assumed that temporary ID 2003 has been selected in step S214, the weight of food item 40 with temporary ID 2003 is 400 g (see FIG. 13). Because a wireless tag ID associated with 400 g is not included in the candidate IDs (ID 101 and ID 102) identified in step S215, it is not possible to identify a wireless tag ID that corresponds to temporary ID 2003. Such a situation may occur when a wireless tag falls off from food item 40 in refrigerator 10, and food item 40 is unloaded with its wireless tag remaining stored in refrigerator 10.

As described above, if a wireless tag ID that corresponds to the temporary ID cannot be identified in step S216 (No in S217), registrant 19*d* identifies, based on the unloaded item information (weight and position) associated with the temporary ID in the unloaded item management information (see FIG. 13), a wireless tag ID (namely, ID 103) that is most similar to the temporary ID in the wireless tag IDs in the registration information (see FIG. 11), as a wireless tag ID that corresponds to the temporary ID (S220). Registrant 19*d* deletes the information (weight, position, and food code number) associated with the identified wireless tag ID from the registration information (S218), decrements the number of unloaded items by 1 (S219), and returns to the determination processing of step S213.

As a result of the deregistration processing described above, the registration information is updated from the state shown in FIG. 11 to the state shown in FIG. 3.

As described above, even when a situation occurs in which a wireless tag falls off from food item 40 in refrigerator 10, and food item 40 is unloaded with its wireless tag remaining stored in refrigerator 10, refrigerator 10 can delete the wireless tag ID of food item 40 from the registration information.

The unloading operation may be simplified. For example, a wireless tag ID that is included in the registration information (see FIG. 11) before door 13 is open and is not included in the fifth wireless tag information (see FIG. 14) after door 13 is closed may be identified as the wireless tag ID of unloaded food item 40. That is, refrigerator 10 may identify, from among the wireless tag IDs that are included in the registration information before a second period (the period from step S204 to step S210), an ID that cannot be read by wireless tag reader 17 after the second period, as the ID of unloaded food item 40, the second period being a period from when door 13 is opened to when door 13 is closed that is determined based on a result of detection performed by door sensor 15. Also, refrigerator 10 may delete the identified wireless tag ID from the registration information.

[Operation of Loading Food Item According to Variation 1]

In step S117 shown in FIG. 10, a wireless tag ID (candidate ID) that corresponds to temporary ID 1001 is identified based on weight because the weight associated with temporary ID 1001 in the loaded item management information (see FIG. 8) and the weight associated with temporary ID 1002 in the loaded item management information is different. However, if the weight associated with temporary ID 1001 in the loaded item management information and the weight associated with temporary ID 1002 in the loaded item management information are the same, it is not possible to identify a wireless tag ID that corresponds to temporary ID 1001 based on weight.

In this case, registrant 19*d* may designate wireless tag IDs that may correspond to the temporary ID as pending. FIG. 16 is a diagram showing an example of the registration information in which wireless tag IDs that may correspond to the temporary ID are designated as pending. In this case, when either one of food item 40 with ID 101 or food item 40 with ID 102 is unloaded, the weight at the position of unloaded food item 40 is reduced by 100 g, and after door 13 is closed, the ID of unloaded food item 40 cannot be read. Accordingly, registrant 19*d* can identify a wireless tag ID that corresponds to the temporary ID at the time of unloading.

As described above, in the case where a plurality of candidate IDs are identified, and another food item 40 that has a weight equal to the weight of food item 40 that is already in refrigerator 10 in first period T1 is loaded, microcomputer 19 identifies one of the plurality of candidate IDs as the wireless tag ID of another food item 40. By doing so, even if two or more food items 40 that have an equal weight are loaded into refrigerator 10 in first period T1, refrigerator 10 can distinguish the two or more food items 40 from each other.

[Operation of Loading Food Item According to Variation 2]

Weight sensors 16 recognize the amount of increase in weight in a period from a start timing of a weight increase to an end timing of the weight increase detected by weight sensors 16, as the weight of food item 40. Accordingly, when a plurality of food items 40 are simultaneously or sequentially loaded into refrigerator 10, in step S105 shown in FIG. 5, weight sensors 16 may detect the plurality of food items 40 as one food item 40. For example, even when food item 40 with a weight of 100 g and food item 40 with a weight of 200 g are simultaneously loaded, it may be detected that one food item 40 with a weight of 300 g has been loaded. FIG. 17 is a diagram showing an example of loaded item management information when two food items 40 have been detected as one food item 40.

In this case, in step S117 shown in FIG. 10, a wireless tag ID that corresponds to temporary ID 1004 cannot be identified because the weight associated with temporary ID 1004 and the weight associated with the candidate ID do not match each other. Also, in step S121 shown in FIG. 10 as well, it is not possible to identify a wireless tag ID that corresponds to the temporary ID.

In this case, registrant 19d may associate two or more wireless tag IDs with temporary ID 1004 in the registration information. FIG. 18 is a diagram showing an example of the registration information in this case. Specifically, registrant 19d identifies, from among the plurality of candidate IDs, a combination of two or more wireless tag IDs with a total weight that matches the weight associated with temporary ID 1004.

As described above, in the case where a plurality of candidate IDs are identified, and the total weight of a plurality of food items 40 has actually been detected as the weight of food item 40, microcomputer 19 identifies two or more candidate IDs from among the plurality of candidate IDs as wireless tag IDs of food item 40. In this case as well, when either one of food item 40 with ID 101 or food item 40 with ID 102 is unloaded, the weight at the position of unloaded food item 40 is reduced, and after door 13 is closed, the ID of unloaded food item 40 cannot be read. Accordingly, registrant 19d can identify a wireless tag ID at the time of unloading. That is, even when two or more food items 40 that have an equal weight are simultaneously or sequentially loaded in first period T1, refrigerator 10 can distinguish the two or more food items 40 from each other.

In order to prevent a situation as described above in which food items 40 are simultaneously or sequentially loaded, refrigerator 10 may notify the user of the timing at which each food item 40 should be loaded. For example, microcomputer 19 may cause notifier 20 to output a notification sound at the start timing of a weight increase and also at the end timing of the weight increase detected by weight sensors 16. By doing so, when the user starts loading food items 40 on shelf 14, the notification sound is output twice, i.e., at the start timing and the end timing, and thus the user can wait until the second notification sound is output to load another food item 40 on shelf 14. That is, the user can be careful not to simultaneously or sequentially load food items 40 by hearing the notification sounds.

[Operation of Loading Food Item According to Variation 3]

There may be a case where memory 18 has stored, in advance, the following rule: vegetables should be placed on top shelf 14 and dairy products should be placed on second top shelf 14. In this case, in step S117 shown in FIG. 10, registrant 19d may identify a wireless tag ID that corresponds to temporary ID 1001 by checking the type of food item 40 to be placed on shelf 14 against the food code number associated with the candidate ID in the third wireless tag information.

FIG. 19 is a diagram showing an example of loaded item management information according to Variation 3, and FIG. 20 is a diagram showing an example of third wireless tag information according to Variation 3.

As shown in FIG. 19, the loaded item management information according to Variation 3 contains information indicating on which shelf each food item was placed. In the example shown in FIG. 19, food item 40 with a weight of 100 g that corresponds to temporary ID 1001 is placed on top shelf 14, and food item 40 with a weight of 100 g that corresponds to temporary ID 1002 is placed on second top shelf 14.

As shown in FIG. 20, ID 101 and ID 102 are candidate IDs included in the third wireless tag information. However, ID 101 and ID 102 are associated with a weight of 100 g. Accordingly, it is not possible to identify a candidate ID that corresponds to the temporary ID based on weight. However, registrant 19d can identify a candidate ID that corresponds to the temporary ID by checking the type of food item 40 to be placed on shelf 14 associated with the temporary ID in the loaded item management information against the food code number (or in other words, the type of food item 40 read from the wireless tag) associated with the candidate ID in the third wireless tag information. In the example shown in FIGS. 19 and 20, registrant 19d can identify, specifically, that ID 101 corresponds to temporary ID 1001, and ID 102 corresponds to temporary ID 1002.

As described above, in the case where a plurality of candidate IDs are identified, microcomputer 19 identifies one of the plurality of candidate IDs as the wireless tag ID of food item 40, based on the food code number (or in other words, the type of food item 40) associated with each of the plurality of candidate IDs. By doing so, refrigerator 10 can distinguish a plurality of food items 40 from each other without using weight.

Other Variations

In Embodiment 1, refrigerator 10 may be an ordinary home refrigerator, a commercial display refrigerator used in retail stores such as convenience stores, or a professional-use refrigerator.

Also, in Embodiment 1, in order to manage the position of each food item 40 in refrigerator 10, a plurality of weight sensors 16 are provided for each shelf 14. However, managing the position of food item 40 is not a requirement. In the case where it is unnecessary to manage the position of food item 40, it is sufficient to provide one weight sensor 16 for each shelf 14. Also, in the case where it is unnecessary to manage the position of food item 40, weight information may not be included in the wireless tags.

Also, in the case where food items 40 of the same type are stored in refrigerator 10, food code number (information that indicates the type of food item 40) may not be included in the wireless tags.

Also, refrigerator 10 is an example of a storage cabinet, and the present disclosure can be implemented as a storage cabinet that does not have a refrigeration function. Also, articles (or in other words, items) stored in the storage cabinet are not limited to food items 40, and may be other articles. Refrigerator 10 may store articles other than food items 40.

Advantageous Effects, Etc

As described above, refrigerator 10 includes door 13 and shelf 14 on which items are placed, and the items are placed on shelf 14 while door 13 is open. Refrigerator 10 is an example of a storage cabinet, and the items are, specifically, food items 40 or the like. Refrigerator 10 includes: door sensor 15 that detects whether door 13 is open or closed; weight sensor 16 that detects a weight applied to shelf 14; wireless tag reader 17 that reads IDs from wireless tags attached to the items; memory 18 that stores the IDs of the items in refrigerator 10 that were read by wireless tag reader 17, as registration information; and microcomputer 19.

Microcomputer 19 identifies a candidate ID that is readable by wireless tag reader 17 after first period T1 and is not included in the registration information, as a first ID of a first item that is newly loaded, first period T1 being a period from when door 13 is opened to when door 13 is closed that is determined based on a result of detection performed by door sensor 15; identifies an ID that is not readable by wireless tag reader 17 immediately after a weight increase is detected by weight sensor 16 in first period T1, as a second ID of a second item that is newly loaded; and adds, to the registration information, the first ID identified and the second ID identified.

Refrigerator 10 as described above can manage the ID of food item 40 whose wireless tag cannot be read as a result of being placed on shelf 14. That is, refrigerator 10 with improved management accuracy of food items 40 can be achieved.

Also, for example, microcomputer 19 identifies wireless tag IDs that are included in the registration information and the fourth wireless tag information, and are not included in the fifth wireless tag information, as candidate IDs. This processing corresponds to step S215 shown in FIG. 15.

The wireless tag of food item 40 whose wireless tag cannot be read as a result of being placed on shelf 14, when food item 40 is in refrigerator 10 and another food item 40 is unloaded from refrigerator 10, cannot be read both immediately after another food item 40 is unloaded and after door 13 is closed thereafter, and it is therefore possible to determine that another food item 40 that was unloaded from refrigerator 10 does not correspond to food item 40. That is, through the processing described above, refrigerator 10 with improved accuracy of determining unloaded food item 40 can be achieved.

Also, for example, wireless tag reader 17 reads the ID and the weight of each item from its wireless tag, and in the case where a plurality of candidate IDs are identified, microcomputer 19 identifies one of the plurality of candidate IDs as a first ID of a first item based on the weight of the first item detected by weight sensors 16. This processing corresponds to step S117 shown in FIG. 10.

Even when two or more items are loaded in first period T1, refrigerator 10 as described above can distinguish the two or more items from each other.

Also, for example, in the case where a plurality of candidate IDs are identified, and an item that has a weight equal to the weight of the first item is loaded in first period T1, microcomputer 19 identifies one of the plurality of candidate IDs as the first ID of the first item when the item that has a weight equal to the weight of the first item is unloaded. This processing corresponds to the above-described operation of loading food item 40 according to Variation 1.

Even if two or more items that have an equal weight are loaded into refrigerator 10 in first period T1, refrigerator 10 can distinguish the two or more items from each other.

Also, for example, weight sensors 16 recognize the amount of increase in weight in a period from a start timing of a weight increase to an end timing of the weight increase detected by weight sensors 16, as the weight of the first item. In the case where a plurality of candidate IDs are identified, and the total weight of a plurality of items has actually been detected as the weight of the first item, microcomputer 19 identifies two or more of the plurality of candidate IDs as the first IDs of the first item. This processing corresponds to the above-described operation of loading food item 40 according to Variation 2.

Even when two or more items that have an equal weight are simultaneously or sequentially loaded in first period T1, refrigerator 10 as described above can manage the two or more items.

Also, for example, refrigerator 10 further includes notifier 20 that notifies the user of each of the start timing and the end timing.

Refrigerator 10 as described above can notify the user of the timing at which each item should be loaded. That is, refrigerator 10 can help the user not to simultaneously or sequentially load items.

Also, for example, in the case where the type of item to be placed on shelf 14 is set for shelf 14, wireless tag reader 17 reads the ID and the type of item from the wireless tag, and a plurality of candidate IDs are identified, microcomputer 19 identifies, based on the type of item associated with each of the plurality of candidate IDs, one of the plurality of candidate IDs as the first ID of the first item.

This processing corresponds to the above-described operation of loading food item 40 according to Variation 3. In Embodiment 1 described above, the type of item is identified based on food code number.

Refrigerator 10 as described above can distinguish a plurality of items from each other by checking the type of item to be placed on shelf 14 against the type of item read by wireless tag reader 17.

Also, for example, in refrigerator 10, a plurality of weight sensors 16 are provided for each shelf 14. Microcomputer 19 stores position information of the first item detected by the plurality of weight sensors 16 in memory 18 in association with the first ID identified. Microcomputer 19 also stores position information of the second item detected by the plurality of weight sensors 16 in memory 18 in association with the second ID identified.

Refrigerator 10 as described above can manage the position information of items.

Also, for example, microcomputer 19 identifies, from among the IDs that are included in the registration information before a second period, an ID that cannot be read by wireless tag reader 17 after the second period, as the ID of the unloaded item, the second period being a period from when door 13 is opened to when door 13 is closed that is determined based on a result of detection performed by door sensor 15, and deletes the identified ID from the registration information.

Refrigerator 10 as described above can manage unloading of items.

Embodiment 2

Configuration

Figure 21:
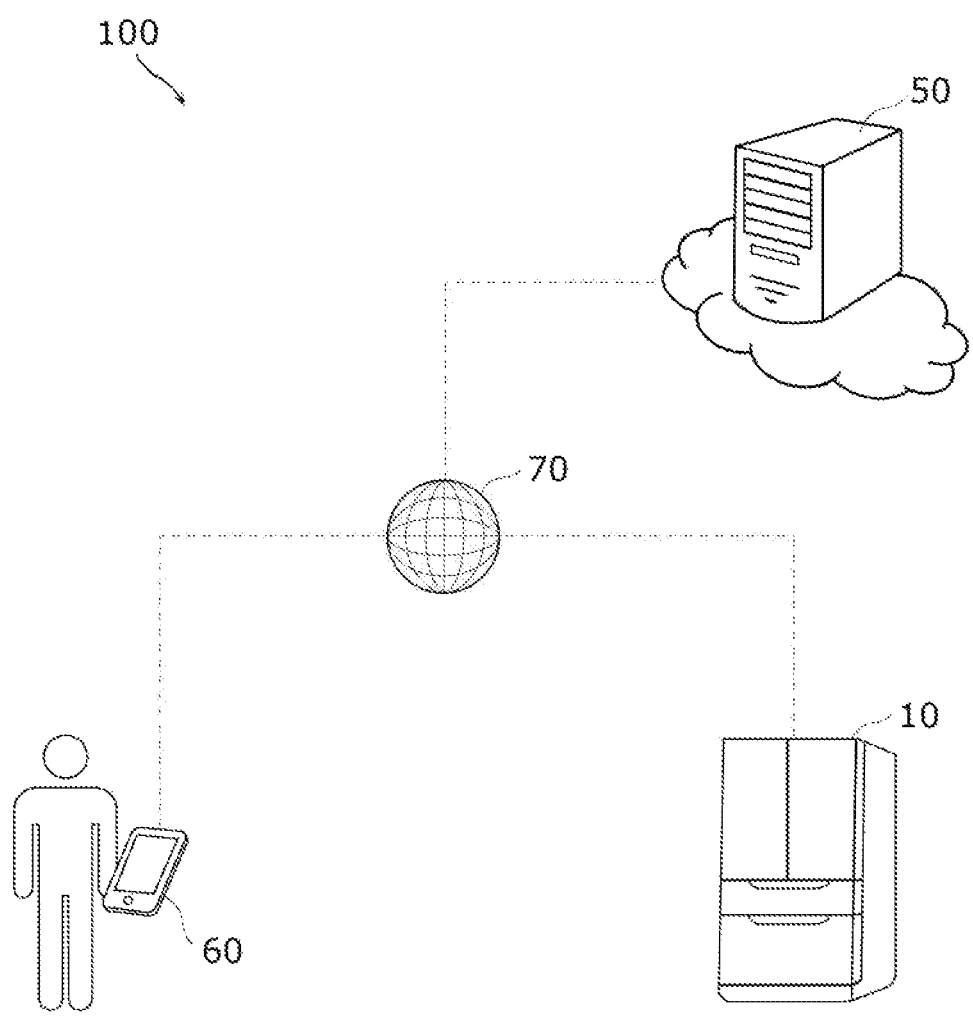
FIG. 21 is a diagram showing a schematic configuration of a food management system according to Embodiment 2.

Next, a food management system according to Embodiment 2 will be described. FIG. 21 is a diagram showing a schematic configuration of the food management system according to Embodiment 2.

As shown in FIG. 21, food management system 100 according to Embodiment 2 includes refrigerator 10, server device 50, and information terminal 60.

Refrigerator 10 uploads the registration information stored in memory 18 to server device 50 one after another. A detailed configuration of refrigerator 10 is as described in Embodiment 1. Refrigerator 10 and server device 50 perform communication via, for example, wide area communication network 70 such as the Internet.

Server device 50 is a so-called cloud server that stores the registration information uploaded by refrigerator 10, and provides the registration information to information terminal 60 in response to a request from information terminal 60. Server device 50 and information terminal 60 perform communication via, for example, wide area communication network 70 such as the Internet.

Figure 22:
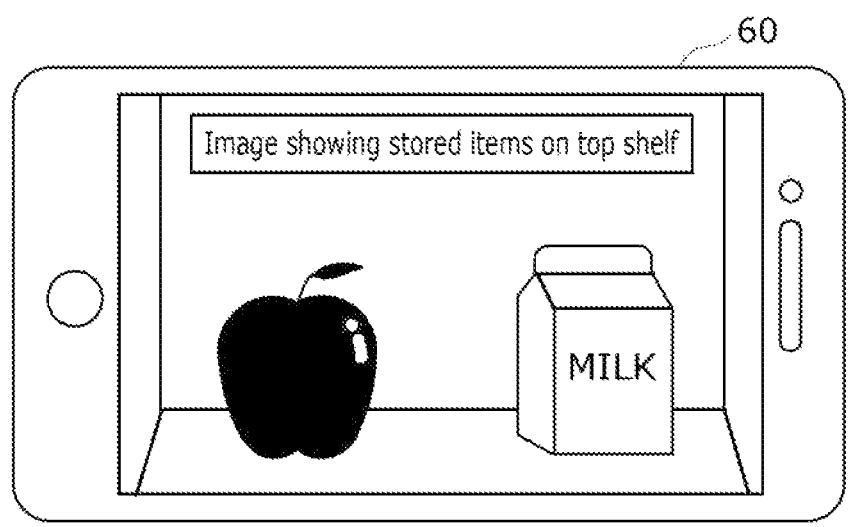
FIG. 22 is a diagram showing an example of an image that shows the positions of food items in the refrigerator.

Information terminal 60 is, for example, a portable information terminal such as a smartphone or a tablet terminal, but may be a stationary information terminal such as a personal computer. Information terminal 60 includes a display, and displays an image that shows the positions of food items 40 in refrigerator 10 on the display based on the registration information provided by server device 50. FIG. 22 is a diagram showing an example of the image that shows the positions of food items 40 in refrigerator 10.

The image shown in FIG. 22 is an image obtained by superimposing icons that respectively correspond to food items 40 (for example, an icon indicating an apple and an icon indicating milk) on virtual internal space 12. The positions on which the icons are superimposed vary according to the position information included in the registration information.

Advantageous Effects, Etc

As described above, with food management system 100, the positions of food items 40 in refrigerator 10 can be visualized. For example, in the case where information terminal 60 is a portable terminal carried by a user, and refrigerator 10 is a home refrigerator installed in the house of the user, the user can check what's inside refrigerator 10 installed in the house from outside via information terminal 60.

Other Embodiments

The embodiments according to the present disclosure have been described above, but the present disclosure is not limited to the embodiments given above.

For example, in the embodiments given above, the processing carried out by a specific processing unit may be carried out by another processing unit. Also, the order in which a plurality of processing operations are performed may be changed, and the plurality of processing operations may be carried out in parallel.

Also, in the embodiments given above, the structural elements may be implemented by executing a software program suitable for the structural elements. The structural elements may be implemented by a program executor such as a CPU or a processor reading and executing a software program recorded in a recording medium such as a hard disk or a semiconductor memory.

Also, the structural elements may be implemented by using hardware. For example, the structural elements may be circuits (or an integrated circuit). The circuits may constitute a single circuit as a whole, or may be separate circuits. Also, the circuits may be general-purpose circuits or dedicated circuits.

Also, generic or specific aspects of the present disclosure may be implemented by a system, a device, a method, an integrated circuit, a computer program, or a computer readable recording medium such as a CD-ROM. Alternatively, generic or specific aspects of the present disclosure may be implemented by any combination of a system, a device, a method, an integrated circuit, a computer program and a recording medium.

For example, the present disclosure may be implemented as a method for managing items executed by a computer, or may be implemented as a program for causing a computer to execute the method for managing items. The present disclosure may be implemented as a computer readable non-transitory recording medium in which such a program is recorded.

One or more aspects of the present disclosure also encompass other embodiments obtained by making various modifications that can be conceived by a person having ordinary skill in the art to the above embodiments as well as embodiments implemented by any combination of the structural elements and the functions of the above embodiments without departing from the scope of the one or more aspects of the present disclosure.

REFERENCE SIGNS LIST

10 refrigerator (storage cabinet)
11 main body
12 internal space
13 door
14 shelf
15 door sensor
16 weight sensor
17 wireless tag reader
18 memory
19 microcomputer
19a activator
19b determiner
19c acquirer
19d registrant
20 notifier
40 food item (item)
50 server device
60 information terminal
70 wide area communication network
100 food management system

The invention claimed is:

1. A storage cabinet including a door and a shelf on which items are placed, wherein the items are placed on the shelf while the door is open,
   the storage cabinet comprising:
      a door sensor that detects whether the door is open or closed;
      a weight sensor that detects a weight applied to the shelf;
      a wireless tag reader that reads IDs from wireless tags attached to the items;
      a memory that stores the IDs of the items in the storage cabinet read by the wireless tag reader, as registration information; and
      a microcomputer,
      wherein the microcomputer:
         identifies, from among IDs that are readable by the wireless tag reader after a first period, a candidate ID that is an ID not included in the registration information, as a first ID of a first item that is newly loaded, the first period being a period from when the door is opened to when the door is closed that is determined based on a result of detection performed by the door sensor;
         identifies an ID that is not readable by the wireless tag reader immediately after a weight increase is detected by the weight sensor in the first period, as a second ID of a second item that is newly loaded; and
         adds, to the registration information, the first ID identified and the second ID identified.

2. The storage cabinet according to claim 1,
wherein the microcomputer:
identifies an ID that is readable by the wireless tag reader immediately after a weight reduction is detected by the weight sensor in the first period and is not readable immediately after the door is closed, as a third ID of a third item that is unloaded; and
deletes, from the registration information, the third ID identified.

3. The storage cabinet according to claim 1,
wherein the wireless tag reader reads, from each of the wireless tags, the ID and a weight of the item, and
in a case where a plurality of candidate IDs are each identified as the candidate ID, the microcomputer identifies, based on a weight of the first item detected by the weight sensor, one of the plurality of candidate IDs as the first ID of the first item.

4. The storage cabinet according to claim 3,
wherein, in a case where the plurality of candidate IDs are each identified as the candidate ID, and another item that has a weight equal to the weight of the first item is loaded in the first period, the microcomputer identifies one of the plurality of candidate IDs as the first ID of the first item when the other item is unloaded.

5. The storage cabinet according to claim 3,
wherein the weight sensor recognizes an amount of increase in weight in a period from a start timing of a weight increase to an end timing of the weight increase detected by the weight sensor, as the weight of the first item, and
in a case where the plurality of candidate IDs are each identified as the candidate ID, and a total weight of a plurality of items is actually detected as the weight of the first item, the microcomputer identifies two or more of the plurality of candidate IDs as the first ID of the first item.

6. The storage cabinet according to claim 5, further comprising:
a notifier that notifies a user of the start timing and the end timing.

7. The storage cabinet according to claim 1,
wherein, for the shelf, a type of item to be placed on the shelf is set,
the wireless tag reader reads, from each of the wireless tags, the ID and a type of item, and
in a case where a plurality of candidate IDs are each identified as the candidate ID, the microcomputer identifies, based on the type of item associated with each of the plurality of candidate IDs, one of the plurality of candidate IDs as the first ID of the first item.

8. The storage cabinet according to claim 1, further comprising:
a plurality of weight sensors for the shelf, each of the plurality of weight sensors being the weight sensor,
wherein the microcomputer:
stores position information of the first item detected by the plurality of weight sensors in the memory in association with the first ID identified; and
stores position information of the second item detected by the plurality of weight sensors in the memory in association with the second ID identified.

9. The storage cabinet according to claim 1,
wherein the microcomputer:
identifies, from among the IDs that are included in the registration information before a second period, an ID that is not readable by the wireless tag reader after the second period, as an ID of an item that is unloaded, the second period being a period from when the door is opened to when the door is closed that is determined based on a result of detection performed by the door sensor; and
deletes, from the registration information, the ID identified.

* * * * *